United States Patent
Lee (10) Patent No.: US 10,528,100 B2
(45) Date of Patent: Jan. 7, 2020

(54) DYNAMIC VENTILATION MECHANISM

(71) Applicant: Microsoft Technology Licensing, LLC, Redmond, WA (US)

(72) Inventor: Eugene Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/476,671

(22) Filed: Mar. 31, 2017

(65) Prior Publication Data

US 2018/0284858 A1 Oct. 4, 2018

(51) Int. Cl.
| G06F 1/16 | (2006.01) |
| H05K 5/00 | (2006.01) |
| H05K 7/00 | (2006.01) |
| G06F 1/20 | (2006.01) |

(52) U.S. Cl.
CPC ............ *G06F 1/206* (2013.01); *G06F 1/1618* (2013.01); *G06F 1/1656* (2013.01); *G06F 1/1681* (2013.01); *G06F 1/203* (2013.01); *G06F 2200/202* (2013.01)

(58) Field of Classification Search
CPC . G06F 1/02; G06F 1/203; G06F 1/206; G06F 1/1618; G06F 1/1656; G06F 1/1681
USPC .......................................... 361/679.47–679.51
See application file for complete search history.

(56) References Cited

U.S. PATENT DOCUMENTS

| | | | | |
|---|---|---|---|---|
| 4,980,848 A * | 12/1990 | Griffin | ..................... | G06F 1/203 361/679.09 |
| 6,069,791 A | 5/2000 | Goto et al. | | |
| 6,078,495 A * | 6/2000 | Cipolla | ................... | G06F 1/203 361/679.46 |
| 6,091,600 A * | 7/2000 | Jeong | ..................... | G06F 1/1667 361/679.12 |
| 6,175,492 B1 | 1/2001 | Nobuchi | | |
| 6,256,192 B1 | 7/2001 | Shannon | | |
| 6,459,573 B1 * | 10/2002 | DiStefano | ............... | G06F 1/203 361/679.46 |

(Continued)

FOREIGN PATENT DOCUMENTS

WO 2017034663 A1 3/2017

OTHER PUBLICATIONS

"The effect of airflow direction and air channeling inside computer chassis", http://www.silverstonetek.com/techtalk_cont.php?tid=wh10_0061&area=en, May 2010, 6 pages.

(Continued)

*Primary Examiner* — Anthony M Haughton (74) *Attorney, Agent, or Firm* — Ray Quinney & Nebeker P.C.; Paul N. Taylor (57) ABSTRACT

Thermal management devices and systems, and corresponding methods of cooling a computing device are described herein. The computing device includes a housing and an airflow management device. The housing includes a plurality of vents. The plurality of vents defines openings through the housing, respectively. The airflow management device is configured to block a first vent of the plurality of vents when the computing device is in a first configuration. The airflow management device is also configured to block a second vent of the plurality of vents when the computing device is in a second configuration.

21 Claims, 6 Drawing Sheets

(56) References Cited

U.S. PATENT DOCUMENTS

| | | | |
|---|---|---|---|
| 6,496,369 B2* | 12/2002 | Nakamura | G06F 1/1616 165/80.3 |
| 6,816,371 B2* | 11/2004 | Agata | G06F 1/203 165/121 |
| 6,909,602 B2* | 6/2005 | Dietrich | G06F 1/1616 219/209 |
| 7,457,113 B2 | 11/2008 | Kumhyr et al. | |
| 7,894,184 B2* | 2/2011 | Huang | G06F 1/1616 361/679.11 |
| 8,369,084 B2* | 2/2013 | Chen | G06F 1/203 361/679.47 |
| 8,515,589 B2 | 8/2013 | Haugh et al. | |
| 8,520,382 B2* | 8/2013 | Tye | G06F 1/203 248/685 |
| 9,104,374 B2* | 8/2015 | Tsai | G06F 1/1616 |
| 2005/0023265 A1 | 2/2005 | Lyle et al. | |
| 2008/0156004 A1 | 7/2008 | Macdonald | |
| 2010/0165567 A1* | 7/2010 | Shih | G06F 1/1616 361/679.48 |
| 2010/0167636 A1 | 7/2010 | Bhattacharya et al. | |
| 2013/0027873 A1 | 1/2013 | Chen et al. | |
| 2013/0077241 A1 | 3/2013 | Senatori | |
| 2014/0092544 A1 | 4/2014 | Nishi et al. | |
| 2014/0185219 A1 | 7/2014 | Ali et al. | |

OTHER PUBLICATIONS

"International Search Report and Written Opinion Issued in PCT Application No. PCT/US2018/024230", dated Jul. 12, 2018, 13 Pages.

* cited by examiner

DYNAMIC VENTILATION MECHANISM

BRIEF DESCRIPTION OF THE DRAWINGS

For a more complete understanding of the disclosure, reference is made to the following detailed description and accompanying drawing figures, in which like reference numerals may be used to identify like elements in the figures.

While the disclosed devices, systems, and methods are representative of embodiments in various forms, specific embodiments are illustrated in the drawings (and are hereafter described), with the understanding that the disclosure is intended to be illustrative, and is not intended to limit the claim scope to the specific embodiments described and illustrated herein

DETAILED DESCRIPTION

Current microprocessor design trends include designs having an increase in power, a decrease in size, and an increase in speed. This results in higher power in a smaller, faster microprocessor. Another trend is towards lightweight and compact electronic devices. As microprocessors become lighter, smaller, and more powerful, the microprocessors also generate more heat in a smaller space, making thermal management a greater concern than before.

The purpose of thermal management is to maintain the temperature of a device within a moderate range. During operation, electronic devices dissipate power as heat that is to be removed from the device. Otherwise, the electronic device will get hotter and hotter until the electronic device is unable to perform efficiently. When overheating, electronic devices run slowly and dissipate power poorly. This can lead to eventual device failure and reduced service life.

As computing devices get smaller (e.g., thinner), thermal management becomes more of an issue. Heat may be dissipated from a computing device using forced and natural convection, conduction, and radiation as a way of cooling the computing device as a whole and a processor operating within the computing device. For forced convection, a computing device may include one or more fans used to move air through the computing device and cool one or more heat generating components of the computing device.

The one or more fans pull air through inlet vents and push air out of outlet vents. A portion of the outlet vents may be on a top side of a chassis of the computing device. If the computing device is a laptop computer, for example, a display of the computer may be rotatably connected to the chassis via a hinge. When the display is rotated towards a closed position, in which the display is in physical contact with or adjacent to the chassis, air exiting the outlet vents may be blocked by and displaced along the display. At least some of the air exiting the outlet vents may then be pulled in through the inlet vents. This increases the temperature of the cooling air pulled through the inlet vents, thus reducing the efficiency of the thermal management provided for cooling the one or more heat generating components of the computing device.

Disclosed herein are apparatuses, systems, and methods for a dynamic ventilation mechanism in a computing device to control airflow out of and/or into the computing device and thus provide optimal thermal management. The dynamic ventilation mechanism actively changes a direction of the airflow produced by the one or more fans of the computing device. The dynamic ventilation mechanism moves from a first position relative to the chassis, in which a barrier of the dynamic ventilation mechanism at least partially blocks a vent through the chassis, into a second position relative to the chassis, in which the barrier does not block the vent through the chassis, based on rotational movement of the display relative to the chassis.

For example, the barrier of the dynamic ventilation mechanism directs the exhaust airflow towards the outlet vents on the top side of the chassis when the computing device is in an open position. When the computing device is in the closed position, the barrier blocks the outlet vents on the top side of the chassis and directs the exhaust airflow towards a back side of the computing device (e.g., through the hinge).

The dynamic ventilation mechanism allows for a more efficient exhaust path for thermal performance and eliminates recirculation of exhaust air within the computing device, which may cause drastic throttling of the computing device. By actively altering the airflow out of the computing device and preventing the recirculation of the exhaust air, the overall thermal performance of the computing device is improved.

As an example, the computing device may include a chassis including at least one vent. Each vent of the at least one vent defines an opening through the chassis, respectively. The computing device also includes a display rotatably attached to the chassis, and an airflow management device. The airflow management device is configured to move from a first position relative to the chassis to a second position relative to the chassis in response to the display moving from a first rotational position relative to the chassis to a second rotational position relative to the chassis. The airflow management device at least partially blocks one or more vents of the at least one vent when the display is in the second rotational position relative to the chassis.

Such heat dissipation apparatuses, systems, and methods have several potential end-uses or applications, including any electronic device to be cooled. For example, the heat dissipation apparatus may be incorporated into personal computers, server computers, tablet or other handheld computing devices, laptop or mobile computers, gaming devices, communications devices such as mobile phones, multiprocessor systems, microprocessor-based systems, set top boxes, programmable consumer electronics, network PCs, minicomputers, mainframe computers, or audio or video media players. In certain examples, the heat dissipation apparatus may be incorporated within a wearable electronic device, where the device may be worn on or attached to a person's body or clothing. The wearable device may be attached to a person's shirt or jacket; worn on a person's wrist, ankle, waist, or head; or worn over their eyes or ears. Such wearable devices may include a watch, heart-rate monitor, activity tracker, or head-mounted display.

Using one or more of these features described in greater detail below, improved heat dissipation may be provided for the electronic device. With the improved heat dissipation feature, a more powerful microprocessor may be installed for the electronic device, a thinner electronic device may be designed, a higher processing speed may be provided, the electronic device may be operated at a higher power for a longer period of time, fans may be operated at a lower speed, or any combination thereof may be provided when compared to a similar electronic device without one or more of the improved heat dissipation features. In other words, the heat dissipation features described herein may provide improved thermal management for an electronic device such as a mobile phone, tablet computer, or laptop computer.

Figure 1:
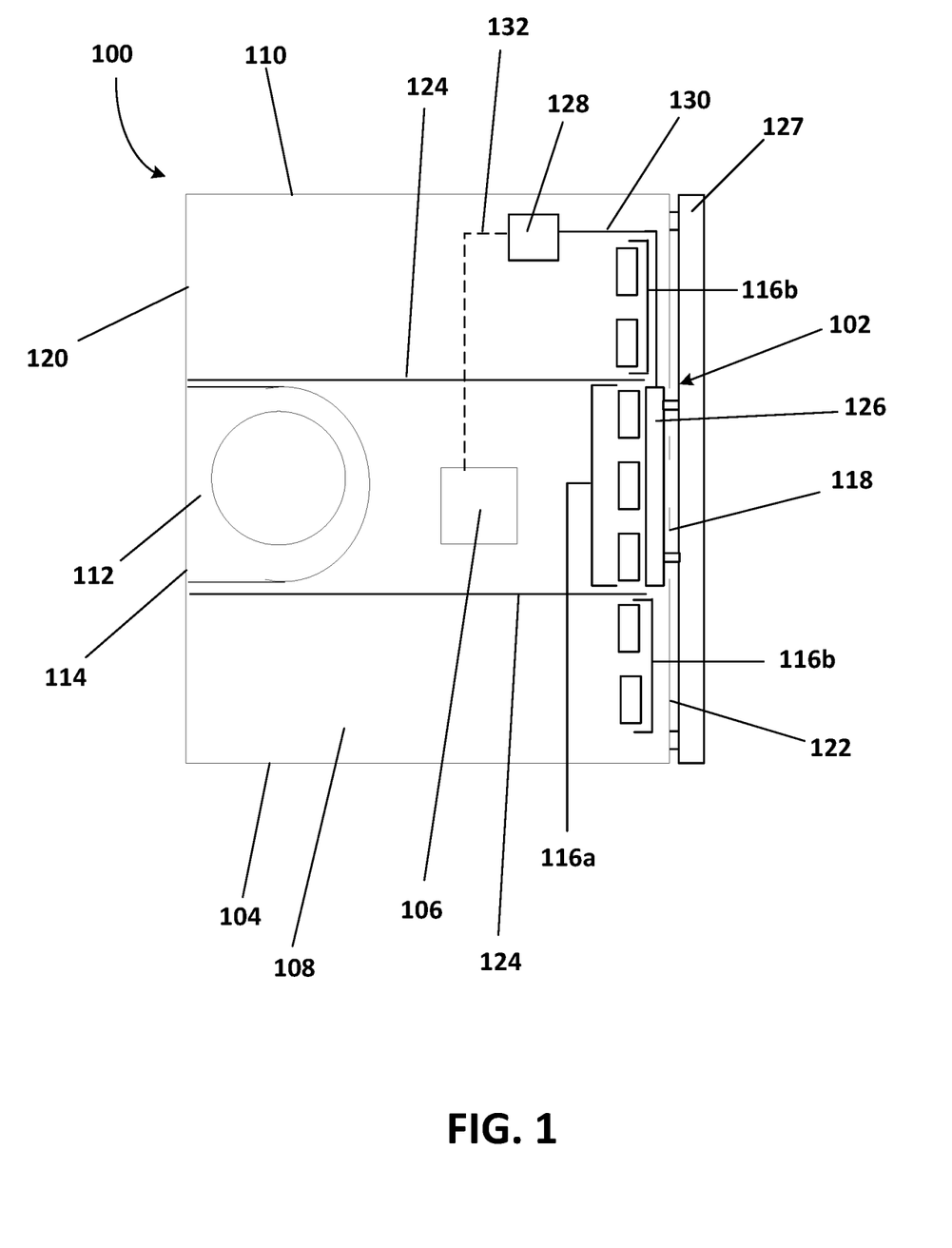
FIG. 1 depicts a bottom view of a computing device including a dynamic ventilation mechanism with a bottom surface removed.

FIG. 1 depicts a bottom view of a computing device 100 including a dynamic ventilation mechanism 102 with a bottom surface removed. The computing device 100 may be any number of computing devices including, for example, a personal computer, a server computer, a tablet or other handheld computing device, a laptop or mobile computer, a communications device such as a mobile phone, a multi-processor system, a microprocessor-based system, a set top box, a programmable consumer electronic device, a network PC, a minicomputer, a mainframe computer, or an audio and/or video media player.

The computing device 100 includes a housing 104 (e.g., a chassis) that at least partially supports at least the dynamic ventilation mechanism 102 and one or more heat generating components 106. The housing 104 includes a top 108, a bottom (not shown), and at least one side 110 extending between the top 108 and the bottom of the housing 104. The housing 104 may be made of any number of materials including, for example, plastic or metal.

The one or more heat generating components 106 may be any number of electrically powered devices including, for example, a processor, a graphics card, memory, a power supply, a hard drive, or another electrically powered device. The one or more heat generating components 106 may be supported by the housing 104 via, for example, a printed circuit board (PCB) (not shown) attached to and/or supported by the housing 104. The one or more heat generating components 106 are in communication with each other, components of the dynamic ventilation mechanism 102, and/or other electrical devices or components (e.g., fans) of the computing device 100 via the PCB, for example. The computing device 100 may include a number of components not shown in FIG. 1 (e.g., a hard drive, a power supply, connectors).

One heat generating component 106 is shown in the example of FIG. 1. More heat generating components 106 may be included in the computing device 100. In one example, the heat generating component 106 is a processor. In other examples, the heat generating component 106 represents a different component within the computing device 100 (e.g., a hard drive, a power supply, or another processor).

In the example shown in FIG. 1, the computing device 100 includes one or more fans 112 (e.g., a fan) to actively cool the one or more heat generating components 106. The one or more fans 112 pull cooling air into the computing device 100 and move heat out of the computing device 100 via inlet/outlets 114 of the one or more fans 112, vents 116 and 118 through the housing 104, other openings (e.g., vents) through the housing 104, or any combination thereof.

The one or more fans 112 are in communication with at least one of the heat generating components 106 and/or another heat generating component. The one or more fans 112 may be any number of different types of fans including, for example, an axial-flow fan, a centrifugal fan, a crossflow fan, or another type of fan. The one or more fans 112 may be sized and may rotate at a speed based on the heat generating component 106 to be cooled (e.g., based on the heat generated by the heat generating component 106 to be cooled). Each of the one or more fans 112 may be the same type of fan, or different types of fans may be used. While the example of FIG. 1 shows a single fan 112, the computing device 100 may include more fans.

In the example shown in FIG. 1, the vents 116 are vents through the top 108 of the housing 104 of the computing device 100. The at least one side 110 of the housing 104 may include four or more sides including, for example, a front 120, a back 122 opposite the front 120, and two sides 110 extending between the front 120 and the back 122. The vents 116 may include any number of vents (e.g., 16 vents) and may be positioned equally spaced from each other in a row adjacent to the back 122 of the housing 104. In other examples, the vents 116 are positioned relative to each other and relative to the top 108 and/or the back 122 of the housing 104 differently compared to the example shown in FIG. 1. For example, the vents 116 may include more than one row of vents in line with each other or offset from each other.

In one example, the vents 116 include a first portion of vents 116a and a second portion of vents 116b. The first portion of the vents 116a, for example, act as outlet vents, while the second portion of the vents 116b, for example, act as inlet vents. The vents 116 may be separated into the first portion of vents 116a and the second portion of vents 116b by walls 124. The walls 124 may direct air pulled into the computing device 100 by the one fan 112 shown in FIG. 1 past the heat generating component 106 and out of the first portion of the vents 116a. In the example shown in FIG. 1, the walls 124 define three interior vents 116 as the first portion of the vents 116a. The computing device 100 may include additional fans (not shown) adjacent to the second portion of the vents 116b and/or outside the walls 124. The additional fans may pull air through the second portion of the vents 116b and push air through other openings (not shown) through the housing 104 of the computing device 100. In one example, the vents 116 are separated into inlet vents and outlet vents without the use of walls, but with positioning of fans running in corresponding directions adjacent to the first portion of the vents 116a and the second portion of the vents 116b, respectively. In another example, all of the vents 116 are inlet vents or outlet vents. The first portion of the vents 116a and/or the second portion of the vents 116b may include more or fewer vents compared to the example shown in FIG. 1.

In the example shown in FIG. 1, the vents 118 are vents through a side of the at least one side 110 (e.g., the back 122) of the housing 104 of the computing device 100. The vents 118 may include any number of vents (e.g., eight vents) and may be positioned equally spaced from each other in a row. In other examples, the vents 118 are positioned relative to each other and relative to the top 108, the bottom, and/or the back 122 of the housing 104 differently compared to the example shown in FIG. 1. For example, the vents 116 may include more than one row of vents in line with each other or offset from each other, and/or the vents 118 may be positioned closer to the top 108 or the bottom of the housing 104. In one example, all of the vents 118 are outlet vents. In another example, all of the vents 118 are inlet vents. In yet another example, a first portion of the vents 118 are inlet vents and a second portion of the vents 118 are outlet vents.

The dynamic ventilation mechanism 102 includes an airflow management device 126 (e.g., a barrier) that is movable between a first position relative to the housing 104, as shown in FIG. 1, and a second position (see FIG. 5) relative to the housing 104. The barrier 126 may be made of any number of materials (e.g., plastic) and may be any number of shapes (e.g., with a rectangular cross-section or a curved cross-section). The barrier 126 may be rigid or flexible. The barrier 126 may be sized such that the barrier 126 is operable to block at least a portion of the vents 116 (e.g., the first portion of the vents 116a) when the barrier 126 is in the second position).

The barrier 126 moves in response to rotational movement of a portion of the computing device 100 (e.g., a display and/or a hinge 127) relative to the housing 104. For example, the barrier 126 may be physically connected to the hinge 127 of the computing device 100, and the barrier 126 moves relative to the housing 104 as the hinge 127 rotates relative to the housing 104 (see FIGS. 4 and 5).

In one example, the dynamic ventilation mechanism 102 also includes an actuator 128 that moves the barrier 126 between the first position relative to the housing 104 and the second position relative to the housing 104. For example, the actuator 128 may be a servo motor or another actuator that is mechanically connected (e.g., via mechanical connection 130) to the barrier 126 to slide and/or rotate the barrier 126 between the first position and the second position. The servo motor 128, for example, may be powered and/or may be controlled with the processor 106 via the PCB and/or other electrical connections (e.g., via electrical connection 132).

In another example, the dynamic ventilation mechanism 102 includes a wire made of a shape memory alloy such as, for example, Nitnol. The wire is physically connected to the barrier 126 and moves the barrier 126 or activates a mechanism configured to move the barrier 126 when a temperature at the dynamic ventilation mechanism 102 exceeds a predetermined temperature.

The barrier 126 blocks at least a portion of the vents 116 (e.g., the first portion of the vents 116a) when the barrier 126 is in the second position. In one example, the barrier 126 completely blocks the first portion of the vents 116a when the barrier 126 is in the second position. In another example, the barrier 126 only partially blocks the first portion of the vents 116a (e.g., more than half of each vent 116a) when the barrier 126 is in the second position. In the example shown in FIG. 1, the barrier 126 does not block any vents 116, 118 when the barrier 126 is in the first position. In other examples, the barrier 126 blocks at least a portion of the vents 118 when the barrier 126 is in the first position. For example, the barrier 126 may rotate from the first position, in which the barrier 126 blocks the vents 118 through the back 122 of the housing 104, to the second position, in which the barrier 126 blocks the first portion of the vents 116a through the top 108 of the housing 104.

Figure 2:
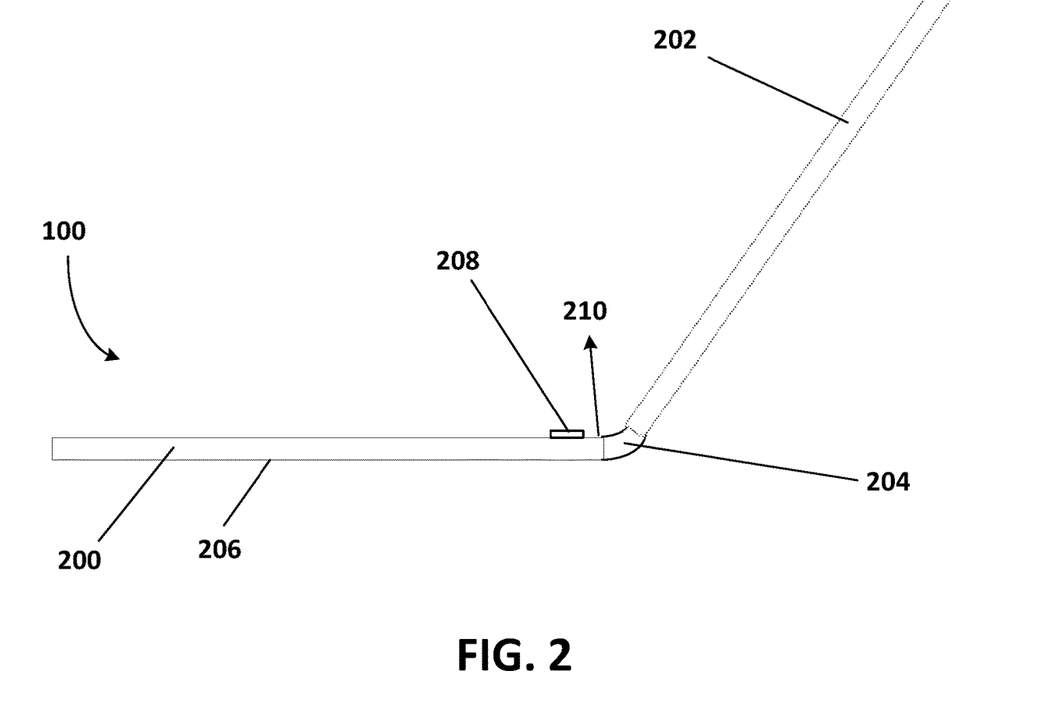
FIG. 2 depicts a side view of a computing device in a first configuration.
Figure 3:
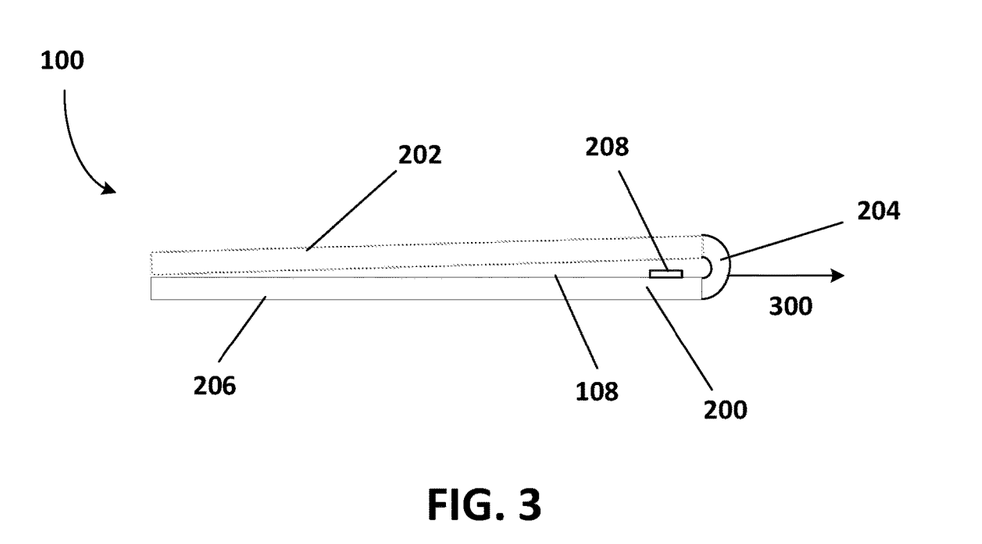
FIG. 3 depicts a side view of the computing device of FIG. 2 in a second configuration.

The barrier 126 blocks at least the portion of the vents 116 to prevent hot exhaust air from exiting the top 108 of the housing 104 and being pulled back into the computing device 100 when the computing device 100 is closed. FIG. 2 shows a side view of the computing device 100 or another computing device in an open configuration (e.g., a first configuration), and FIG. 3 shows a side view of the computing device 100 or the other computing device in a closed configuration (e.g., a second configuration). The computing device 100 includes a chassis 200 (e.g., the housing 104) and a display 202. The display 202 is rotatably connected to the chassis 200 via a hinge 204. The display 202 is rotatable relative to the chassis 200 via the hinge 204 from a first rotational position relative to the chassis 200 (e.g., the open configuration; a position in which a surface of the display 202 is at an angle of anywhere between 90 degrees and 135 degrees, or more relative to the top 108 of the chassis 200) to a second rotational position relative to the chassis 200 (e.g., the closed configuration; a position in which a surface of the display 202 is at an angle less than 90 degrees relative to the top 108 of the chassis 200, or is parallel to the top 108 of the chassis 200). The display 202 may be rotated relative to the chassis 200 and/or the chassis 200 may be rotated relative to the display 202 into different and/or additional positions. For example, the display 202 may rotate from the second rotational position relative to the chassis 200 (e.g., with the display 202 adjacent to the top 108 of the chassis 200) 360 degrees to a third rotational position relative to the chassis 200 (e.g., with the display 202 adjacent to a bottom 206 of the chassis 200).

In one example, the computing device 100 further includes a sensor 208 (see FIG. 2) configured to determine a rotational position of the display 202 relative to the chassis 200. The sensor 208 may determine an angle of the display 202 relative to the chassis 200 and/or may identify when the computing device 100 is in the second configuration (e.g., the closed configuration). The sensor 208 may be a mechanical sensor, an optical sensor, an electric sensor, or any combination thereof. The sensor 208 may be positioned in any number of positions in or on the computing device 200.

In the first configuration of the computing device 100, an example of which is illustrated in FIG. 2, a user of the computing device 100 may operate the computing device 100 with, for example, an input device included in the chassis 200 (e.g., a keyboard). In the first configuration of the computing device 100, the hinge 204 blocks the vents 118 (see FIGS. 1 and 4), and the hot exhaust air exits (arrow 210) the first portion of the vents 116a, for example. In the second configuration of the computing device 100, an example of which is illustrated in FIG. 3, the computing device 100 is no longer operable via the keyboard of the chassis 200 and the display 202 is positioned adjacent to the chassis 200. In the second configuration of the computing device 100, the barrier 126 blocks the first portion of the vents 116a (see FIGS. 1, 5, and 6), and the hot exhaust air exits (arrow 300) the vents 118, for example.

Figure 4:
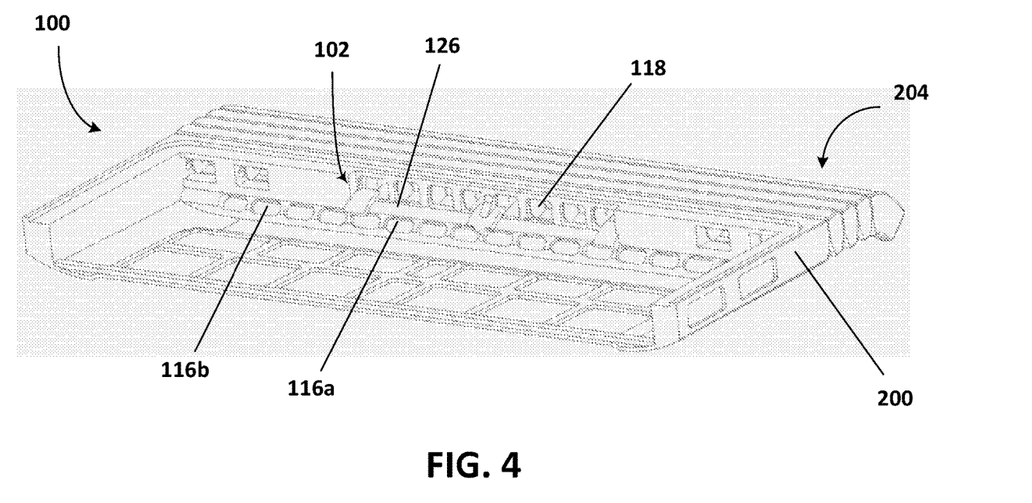
FIG. 4 depicts an isometric view of a chassis of a computing device in the first configuration.

FIG. 4 depicts an isometric view of an example of the chassis 200 of the computing device 100 in the first configuration. FIG. 4 shows the bottom of the computing device 100 with a bottom surface removed such that the dynamic ventilation mechanism 102 is visible. In the first configuration of the computing device 100 (e.g., the open configuration), the hinge 204 blocks at least some of the vents 118. In the example shown in FIG. 4, the hinge 204 blocks all of the vents 118.

In such a configuration of the computing device 100, the barrier 126 of the dynamic ventilation mechanism 102 is in the first position relative to the chassis 200. In the example shown in FIG. 4, the barrier 126 does not block the vents 116 or the vents 118. In one example, in the first position relative to the chassis 200, the barrier 126 partially blocks at least a portion of the vents 116 and/or at least a portion of the vents 118. For example, in the first position relative to the chassis 200, the barrier 126 at least partially blocks some or all of the vents 118. In the first configuration of the computing device 100, hot exhaust air flows out of the computing device 100 via, for example, the first portion of the vents 116a (see arrow 210 of FIG. 2).

As the display 202 (see FIGS. 2 and 3) rotates from the first configuration of the computing device 100 to the second configuration of the computing device 100 (e.g., the closed configuration) via the hinge 204, the barrier 126 moves from the first position relative to the chassis 200 to the second position relative to the chassis 200. The barrier 126 blocks at least a portion of the vents 116 (e.g., the first portion of the vents 116a) when the barrier 126 is in the second position relative to the chassis 200. Hot exhaust air flows out of the computing device 100 via the vents 118 (see arrow 300 of FIG. 3).

Figure 5:
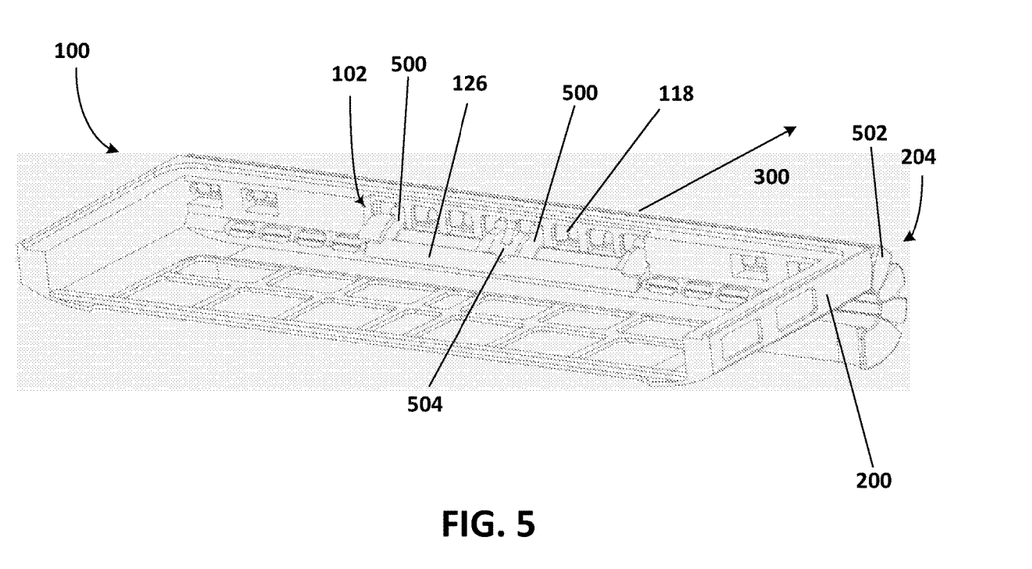
FIG. 5 depicts an isometric view of a chassis of a computing device in the second configuration.

FIG. 5 depicts an isometric view of an example of the chassis 200 of the computing device 100 in the second configuration. FIG. 5 shows the bottom of the computing device 100 with the bottom surface removed such that the dynamic ventilation mechanism 102 is visible. In the example shown in FIG. 5, the barrier 126 is in the second position relative to the chassis 200. The dynamic ventilation mechanism 102 includes at least one (e.g., four) extension 500 that extends away from the barrier 126 to an end of the at least one extension 500. The at least one extension 500 may be contiguous with the barrier 126 or may be a separate part and physically attached to the barrier 126. The at least one extension 500 may be made of the same material as the barrier 126 or may be made of a different material than the barrier 126. For example, the at least one extension 500 may be made of a plastic. The at least one extension 500 may be rigid or flexible. The movement of the barrier 126 between the first position relative to the chassis 200 and the second position relative to the chassis 200 in response to the rotation of the display 204 between the first rotational position relative to the chassis 200 and the second rotational position relative to the chassis 200 may be based on a physical connection between, for example, the at least one extension 500 and a portion of the hinge 204.

The hinge 204 may, for example, be a progressive hinge that includes inner hinge assemblies and outer hinge covers 502. The inner hinge assemblies may include a plurality of linkages rotatably attached to each other via pins and/or bearings. One or more linkages of the plurality of linkages may be biased against rotational movement relative to other linkages of the plurality of linkages, the chassis 200, and/or the display with one or more springs or dampers.

Figure 6:
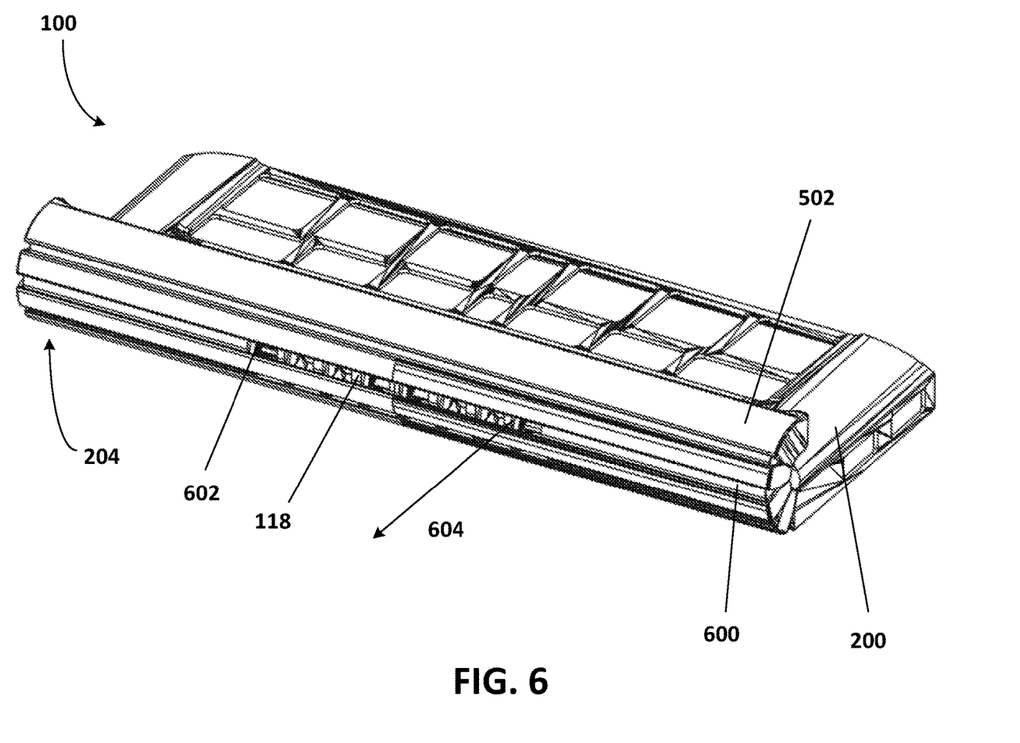
FIG. 6 depicts an isometric view of a chassis and a hinge of a computing device in the second configuration.

FIG. 6 depicts another isometric view of an example of the chassis 200 and the hinge 204 of the computing device 100 in the second configuration. The inner hinge assemblies may be covered by one or more inner hinge covers 600. The inner hinge covers 600 may connect adjacent outer hinge covers 502, such that maximum distances between adjacent outer hinge covers 502 are defined. Alternatively, the inner hinge covers 600 may be formed by a single part, over which the outer hinge covers 502 are slidable relative to each other. At least one of the inner hinge covers 600 (e.g., the second or third inner hinge cover 600 from the chassis 200) includes an opening 602. The opening 602 may have any number of shapes and/or sizes. For example, the opening 602 may be rectangular and sized to match the vents 118. When the display 202 moves from the first rotational position relative to the chassis 200 to the second rotational position relative to the chassis 200, at least portions of the outer hinge cover 502 move away from each other, exposing the opening 602. The opening 602 is aligned with the vents 118, and in the second configuration of the computing device 100, which is shown in FIG. 6, hot exhaust air exits the computing device 100 via the vents 118 and the opening 602 (see arrow 604). At different rotational positions of the display 202 relative to the chassis 200 between the first rotational position and the second rotational position, at least some of the outer hinge covers 502 block the opening 602 and thus the vents 118 to varying degrees, respectively. In one example, the opening 602 and the vents 118 are fully blocked in the first rotational position and are fully open in the second rotational position.

As illustrated in FIG. 5, the four extensions 500, for example, extend through corresponding vents 118 and are physically connected, at respective ends of the extensions 500, to the portion of the hinge 204. In one example, the four extensions 500, for example, are physically connected to a portion of the display 202. The portion of the hinge 204 may be one of the outer hinge covers 502 (e.g., an inner surface of the one outer hinge cover 502), one of the inner hinge covers 600, or one of the inner hinge assemblies (an outer surface of the one inner hinge assembly). In one example, different extensions 500 are physically connected to different outer hinge covers 502 or inner hinge assemblies. The four extensions 500, for example, are physically connected to the portion of the hinge 204 in any number of ways including, for example, with an adhesive, screws, or another connector. In one example, the four extensions 500, for example, are physically connected to an outer hinge cover 502 or an inner hinge assembly second closest to the chassis 200.

Points of connection between the four extensions 500, for example, and the portion of the hinge 204 may be closer to the vents 118 through which the four extensions 500 extend, respectively, when the computing device 100 is in the second configuration (e.g., the closed configuration) compared to when the computing device 100 is in the first configuration (e.g., the open configuration). As the hinge 204 rotates towards the top 108 of the chassis 200 to close the computing device 100, distances between the points of connection and the respective vents decreases. The four extensions 500, for example, may have fixed lengths. The barrier 126 thus moves away from the vents 118. In one example, the chassis 200 includes guides 504 that direct the motion of the barrier 126 away from the vents 118 towards the second position relative to the chassis 200, in which the barrier 126 blocks the first portion of the vents 116a. The guides 504 and an inner surface of the chassis 200 may form slots, in which the barrier 126 slides. The guides 504, the slots, and the barrier 126 may be curved since the movement of the points of connection is in a curved path following the movement of the hinge 204 as the display 202 moves between the first rotational position relative to the chassis 200 and the second rotational position relative to the chassis 200. In one example, the four extensions 500, for example, are curved to facilitate the movement of the barrier 126 between the first position relative to the chassis 200 and the second position relative to the chassis 200.

In one example, the dynamic ventilation mechanism 102 includes two or more barriers 126. For example, instead of the single barrier 126 shown in FIG. 4, the dynamic ventilation mechanism 102 may include first and second barriers movable between the first position relative to the chassis 200 and the second position relative to the chassis 200. In another example, the dynamic ventilation mechanism 102 does not include any extensions and is not physically connected to the hinge 204. Instead, an actuator rotates (e.g., via a hinge) and/or slides the barrier 126 between the first position relative to the chassis 200 and the second position relative to the chassis 200. A sensor may identify when the display 202 is in the second rotational position relative to the chassis 200 and generate a signal indicating the identified position. A processor of the computing device 100 may instruct the actuator to move the barrier 126 from the first position relative to the chassis 200 to the second position relative to the chassis 200 based on the signal generated by the sensor.

The dynamic ventilation mechanism of one or more of the present embodiments actively alters the flow of air through a computing device to improve the thermal performance of a thermal management system of the computing device. A direction of fan exhaust is changed towards the top of the computing device when the computing device is open. When the computing device is closed, the fan exhaust no longer exits the computing device through the top of the computing device, as the dynamic ventilation mechanism alters the flow such that fan exhaust exits the computing device through the back of the computing device. This allows for a more efficient exhaust path for thermal performance and eliminates recirculation of the fan exhaust, which may cause throttling of the computing device. In other words, the dynamic ventilation mechanism prevents the intake of exhaust airflow into the computing device 100, thus improving the thermal performance of a thermal management system of the computing device 100 compared to a computing device without such a dynamic ventilation mechanism.

Figure 7:
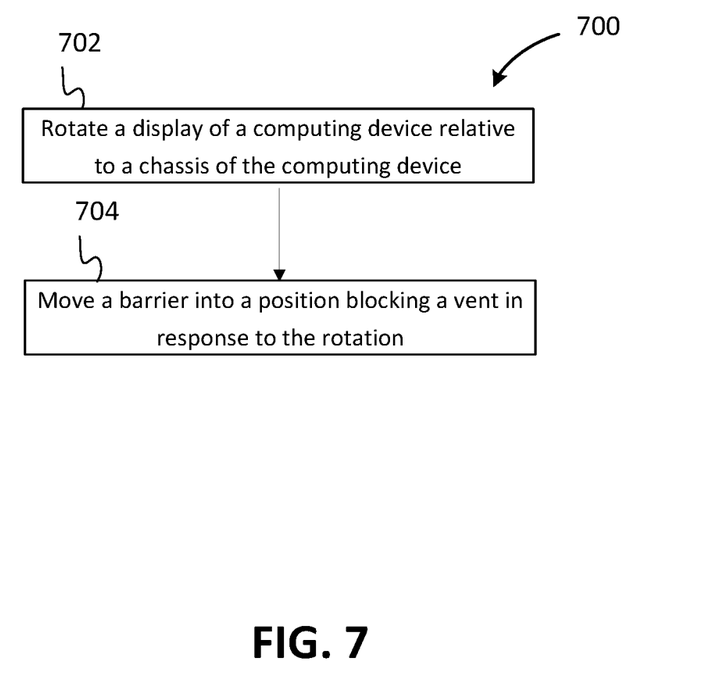
FIG. 7 is a flow diagram of a method for cooling an electronic device in accordance with one example.

FIG. 7 is a flow diagram of a method 700 for controlling airflow into, out of, or into and out of an electronic device in accordance with one example. The electronic device may be a computing device shown in FIGS. 1-6, FIG. 8, or may be another electronic device. The method 700 is implemented in the order shown, but other orders may be used. Additional, different, or fewer acts may be provided. Similar methods may be used for transferring heat.

In act 702, a display of a computing device is rotated relative to a chassis of the computing device. The computing device further includes a display, and a hinge. The display is rotatably connected to the chassis with the hinge and is thus rotatable relative to the chassis of the computing device via the hinge.

In act 704, a barrier of the computing device is moved into a position blocking a vent in response to the rotation of act 702. The computing device further includes at least a first vent and a second vent extending through the chassis. The first vent may be through a side (e.g., a back) of the computing device, and the second vent may be through a top of the computing device. The first vent and/or the second vent may be located in other positions through the computing device (e.g., the chassis).

In one example, the vent that is blocked by the barrier in act 704 is the second vent. Moving the barrier of the computing device into the position blocking the vent may include moving the barrier from a first position to a second position, where the barrier blocks the second vent in the second position. The barrier may be moved from the first position to the second position in response to the display being rotated from a first rotational position relative to the chassis to a second rotational position relative to the chassis.

The barrier is physically attached to a portion of the hinge or the display. The rotation of the display from the first rotational position relative to the chassis to the second rotational position relative to the chassis causes the barrier to move from the first position to the second position. For example, the barrier may include at least one extension extending away from the barrier and through a corresponding first vent to an end of the extension physically connected to the portion of the hinge or the display. As the display rotates towards the chassis, the end of the extension gets closer to the corresponding first vent, causing the barrier to move away from the first vent and towards the second vent.

During the barrier movement away from the first vent and towards the second vent, the barrier may be guided, such that the barrier ends in the second position (e.g., blocking the second vent) when the display reaches the second rotational position relative to the chassis.

In one example, the method 700 further includes determining, by a sensor of the computing device, when the display is in the second rotational position relative to the chassis. In other examples, the sensor may be configured to determine a rotational position of the display relative to the chassis. The sensor may be a mechanical sensor, an optical sensor, an electrical sensor, another sensor, or any combination thereof. For example, the sensor may be a mechanical switch that determines when the display is folded onto and makes contact with the chassis. Alternatively, the sensor may be an optical sensor such as a camera configured to determine, based on captured images, when the position of the display relative to the chassis and/or an angle at which the display is positioned relative to the chassis. The sensor generates a signal identifying when the display is physically contacting the chassis and/or identifying a rotational position or distance of the display relative to the chassis, and sends the generated signal to a processor of the computing device. The processor may control an actuator (e.g., a servomotor) of the computing device connected to the barrier to move the barrier based on the generated signal. For example, when the sensor identifies that the display abuts the chassis, the processor may control the actuator to move the barrier from the first position to the second position, in which the barrier blocks the second vent.

The computing device may include more than one first vent and/or more than one second vent extending through the chassis, and the barrier may block a plurality of the second vents in the second position. In one example, the barrier blocks the first vent in the first position and blocks the second vent in the second position.

Figure 8:
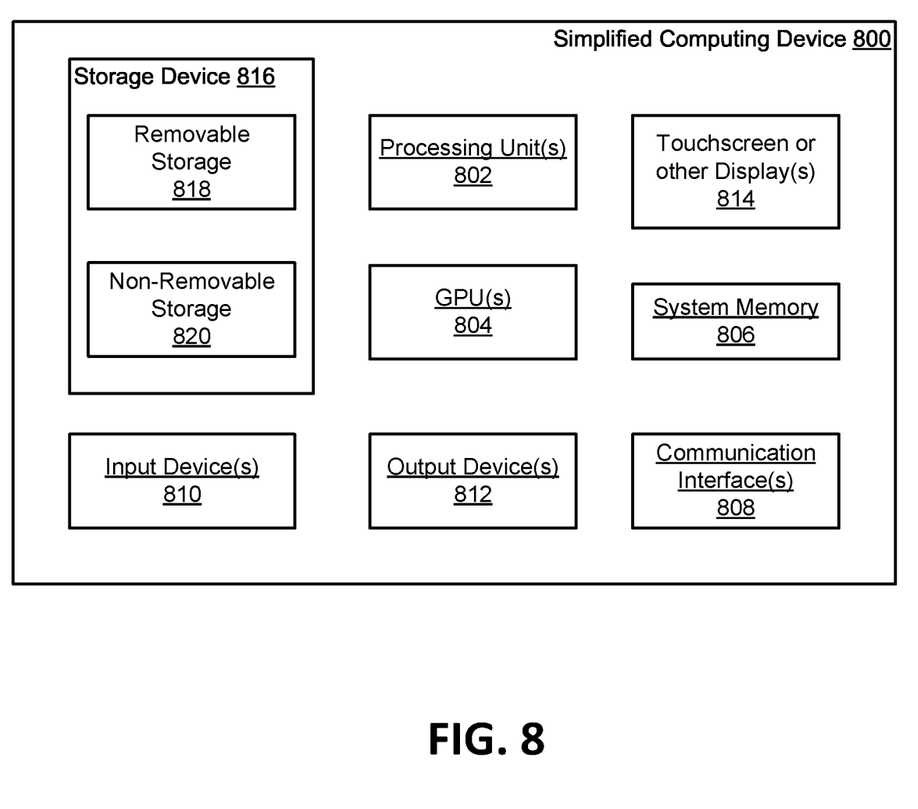
FIG. 8 is a block diagram of a computing environment in accordance with one example for implementation of the disclosed methods or one or more electronic devices.

With reference to FIG. 8, a thermal management system, as described above, may be incorporated within an exemplary computing environment 800. The computing environment 800 may correspond with one of a wide variety of computing devices, including, but not limited to, personal computers (PCs), server computers, tablet and other handheld computing devices, laptop or mobile computers, communications devices such as mobile phones, multiprocessor systems, microprocessor-based systems, set top boxes, programmable consumer electronics, network PCs, minicomputers, mainframe computers, or audio or video media players. For example, the heat dissipating apparatus is incorporated within a computing environment having an active cooling source (e.g., fans).

The computing environment 800 has sufficient computational capability and system memory to enable basic computational operations. In this example, the computing environment 800 includes one or more processing units 802, which may be individually or collectively referred to herein as a processor. The computing environment 800 may also include one or more graphics processing units (GPUs) 804. The processor 802 and/or the GPU 804 may include integrated memory and/or be in communication with system memory 806. The processor 802 and/or the GPU 804 may be a specialized microprocessor, such as a digital signal processor (DSP), a very long instruction word (VLIW) processor, or other microcontroller, or may be a general purpose central processing unit (CPU) having one or more processing cores. The processor 802, the GPU 804, the system memory 806, and/or any other components of the computing environment 800 may be packaged or otherwise integrated as a system on a chip (SoC), application-specific integrated circuit (ASIC), or other integrated circuit or system.

The computing environment 800 may also include other components, such as, for example, a communications interface 808. One or more computer input devices 810 (e.g., pointing devices, keyboards, audio input devices, video input devices, haptic input devices, or devices for receiving wired or wireless data transmissions) may be provided. The input devices 810 may include one or more touch-sensitive surfaces, such as track pads. Various output devices 812, including touchscreen or touch-sensitive display(s) 814, may also be provided. The output devices 812 may include a variety of different audio output devices, video output devices, and/or devices for transmitting wired or wireless data transmissions.

The computing environment 800 may also include a variety of computer readable media for storage of information such as computer-readable or computer-executable instructions, data structures, program modules, or other data. Computer readable media may be any available media accessible via storage devices 816 and includes both volatile and nonvolatile media, whether in removable storage 818 and/or non-removable storage 820. Computer readable media may include computer storage media and communication media. Computer storage media may include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the processing units of the computing environment 800.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

In a first embodiment, a computing device includes a chassis. The chassis includes at least one vent. Each vent of the at least one vent defines an opening through the chassis, respectively. The computing device also includes a display rotatably attached to the chassis and airflow management device. The airflow management device is configured to move from a first position relative to the chassis to a second position relative to the chassis in response to the display moving from a first rotational position relative to the chassis to a second rotational position relative to the chassis. The airflow management device at least partially blocks one or more vents of the at least one vent when the display is in the second rotational position relative to the chassis.

In a second embodiment, with reference to the first embodiment, the at least one vent includes a first row of vents and a second row of vents. The airflow management device is configured to block at least a portion of the second row of vents when the display is in the second rotational position relative to the chassis. The airflow management device does not block the first row of vents when the display is in the second rotational position relative to the chassis.

In a third embodiment, with reference to the second embodiment, the computing device further includes a hinge rotatably connecting the display to the chassis. The hinge at least partially blocks at least a portion of the first row of vents when the display is in the first rotational position relative to the chassis.

In a fourth embodiment, with reference to the third embodiment, the airflow management device is physically connected to a portion of the hinge.

In a fifth embodiment, with reference to the second embodiment, the portion of the second row of vents is a first portion of the second row of vents. A second portion of the second row of vents is not blocked by the airflow management device when the display is in the second rotational position relative to the chassis.

In a sixth embodiment, with reference to the fifth embodiment, the computing device further includes a fan configured to push air out of the first row of vents and the first portion of the second row of vents.

In a seventh embodiment, with reference to the first embodiment, the airflow management device is a barrier that moves between the first position relative to the chassis and the second position relative to the chassis based on a position of the display relative to the chassis.

In an eighth embodiment, with reference to the seventh embodiment, the computing device further includes a sensor configured to determine when the display is in the second rotational position relative to the chassis. The computer device further includes an actuator configured to move the barrier to the second position relative to the chassis when the sensor determines that the computing device is in the second rotational position relative to the chassis.

In a ninth embodiment, with reference to the first embodiment, the chassis includes a top, a bottom, and a side. The side extends from the top to the bottom. The at least one vent extends through the top, the side, or the top and the side.

In a tenth embodiment, with reference to the second embodiment, the airflow management device is configured to block at least a portion of the first row of vents when the display is in the first rotational position relative to the chassis.

In an eleventh embodiment, an airflow management device for a computing device is provided. The computing device includes a display, a chassis, and a first row of vents and a second row of vents through the chassis. The airflow management device includes a barrier that is movable from a first position relative to the chassis to a second position relative to the chassis in response to the display moving from a first rotational position relative to the chassis to a second rotational position relative to the chassis. The barrier at least partially blocks the second row of vents of the computing device in the second position relative to the chassis.

In a twelfth embodiment, with reference to the eleventh embodiment, the airflow management device further includes an extension extending away from the barrier to an end. The end is physically attachable to the display or a hinge of the computing device. The display is rotatably attached to the chassis of the computing device via the hinge. Rotation of the display relative to the chassis causes the barrier to move between the first position relative to the chassis and the second position relative to the chassis.

In a thirteenth embodiment, with reference to the eleventh embodiment, the extension is curved relative to the barrier.

In a fourteenth embodiment, with reference to the eleventh embodiment, the airflow management device further includes an actuator. The actuator is configured to move the barrier between the first position relative to the chassis and the second position relative to the chassis.

In a fifteenth embodiment, with reference to the fourteenth embodiment, the actuator is configured to slide or rotate the barrier between the first position relative to the chassis and the second position relative to the chassis.

In a sixteenth embodiment, with reference to the fifteenth embodiment, the computing device further includes a sensor and a processor. The processor is in communication with the sensor and the actuator. The actuator is configured to move the barrier based on a signal received from a sensor of the computing device. The sensor of the computing device is configured to generate the signal based on a position of the display relative to the chassis.

In a seventeenth embodiment, a method for controlling airflow into, out of, or into and out of an electronic device is provided. The electronic device includes a chassis, a display rotatably connected to the chassis, and at least a first vent and a second vent extending through the chassis. The method includes moving a barrier from a first position to a second position in response to movement between the display and the chassis. The barrier blocks the second vent in the second position.

In an eighteenth embodiment, with reference to the seventeenth embodiment, the electronic device includes a display, a chassis, and a hinge. The display is rotatable relative to the chassis via the hinge. Moving the barrier from the first position to the second position includes moving the barrier from the first position to the second position in response to the display rotating from a first rotational position relative to the chassis to a second rotational position relative to the chassis.

In a nineteenth embodiment, with reference to the eighteenth embodiment, the method further includes determining, by a sensor, when the display is in the second rotational position. Moving the barrier from the first position to the second position includes moving, by an actuator, the barrier from the first position to the second position when the sensor determines the display is in the second rotational position.

In a twentieth embodiment, with reference to the eighteenth embodiment, the barrier is physically attached to the hinge or the display. The rotation of the display from the first rotational position relative to the chassis to the second rotational position relative to the chassis causes the barrier to move from the first position to the second position.

In connection with any one of the aforementioned embodiments, the thermal management device or the method for manufacturing the thermal management device may alternatively or additionally include any combination of one or more of the previous embodiments.

The foregoing description is given for clearness of understanding only, and no unnecessary limitations should be understood therefrom, as modifications within the scope of the claims may be apparent to those having ordinary skill in the art.

The invention claimed is:

1. A computing device comprising:
a chassis comprising at least one vent, each vent of the at least one vent defining an opening through the chassis, respectively, wherein the at least one vent comprises a first row of vents and a second row of vents;
a display rotatably attached to the chassis;
an airflow management device configured to move from a first position relative to the chassis to a second position relative to the chassis in response to the display moving from a first rotational position relative to the chassis to a second rotational position relative to the chassis, the airflow management device at least partially blocking one or more vents of the at least one vent when the display is in the second rotational position relative to the chassis,
wherein a portion of the airflow management device extends through a vent of the first or second row of vents, and
wherein the airflow management device is configured to block at least a portion of the second row of vents when the display is in the second rotational position relative to the chassis, the airflow management device not completely blocking the first row of vents when the display is in the second rotational position relative to the chassis.

2. The computing device of claim 1, further comprising a hinge rotatably connecting the display to the chassis,
wherein the hinge at least partially blocks at least a portion of the first row of vents when the display is in the first rotational position relative to the chassis.

3. The computing device of claim 2, wherein the airflow management device is physically connected to a portion of the hinge.

4. The computing device of claim 1, wherein the portion of the second row of vents is a first portion of the second row of vents, and
wherein a second portion of the second row of vents is not blocked by the airflow management device when the display is in the second rotational position relative to the chassis.

5. The computing device of claim 4, further comprising a fan configured to push air out of the first row of vents and the first portion of the second row of vents.

6. The computing device of claim 1, wherein the airflow management device is a barrier that moves between the first position relative to the chassis and the second position relative to the chassis based on a position of the display relative to the chassis.

7. The computing device of claim 6, further comprising:
a sensor configured to determine when the display is in the second rotational position relative to the chassis; and
an actuator configured to move the barrier to the second position relative to the chassis when the sensor determines that the computing device is in the second rotational position relative to the chassis.

8. The computing device of claim 1, wherein the chassis comprises a top, a bottom, and a side, the side extending from the top to the bottom, and
wherein the at least one vent extends through the top, the side, or the top and the side.

9. The computing device of claim 1, wherein the airflow management device is configured to block at least a portion of the first row of vents when the display is in the first rotational position relative to the chassis.

10. An airflow management device for a computing device, the computing device comprising a display, a chassis, and a first row of vents and a second row of vents through the chassis, the airflow management device comprising:
a barrier that is movable from a first position relative to the chassis to a second position relative to the chassis in response to the display moving from a first rotational position relative to the chassis to a second rotational position relative to the chassis, the barrier substantially blocking the second row of vents of the computing device in the second position relative to the chassis, the barrier not blocking the first row of vents of the computing device in the second position relative to the chassis; and an extension extending away from the barrier to an end, the end being physically attachable to the display or a hinge of the computing device.

11. The airflow management device of claim 10, wherein the display is rotatably attached to the chassis of the computing device via the hinge, and wherein rotation of the display relative to the chassis causes the barrier to move between the first position relative to the chassis and the second position relative to the chassis.

12. The airflow management device of claim 10, wherein the extension is curved relative to the barrier.

13. The airflow management device of claim 10, further comprising an actuator, the actuator being configured to move the barrier between the first position relative to the chassis and the second position relative to the chassis.

14. The airflow management device of claim 13, wherein the actuator is configured to slide or rotate the barrier between the first position relative to the chassis and the second position relative to the chassis.

15. The airflow management device of claim 14, wherein the computing device further comprises a sensor and a processor, the processor being in communication with the sensor and the actuator, and wherein the actuator is configured to move the barrier based on a signal received from a sensor of the computing device, the sensor of the computing device being configured to generate the signal based on a position of the display relative to the chassis.

16. A method for directing airflow through a computing device having a rotatable display, comprising:

while the rotatable display is in a first rotation position, utilizing an airflow management device to direct air flow from at least one intake vent of the computing device to a first exhaust vent of the computing device; and in response to the rotatable display moving from the first rotational position to a second rotational position, utilizing the airflow management device to direct air flow from the at least one intake vent to a second exhaust vent of the computing device by restricting airflow access to the first exhaust vent, wherein the first and second exhaust vents are on different surfaces of the computing device.

17. The method of claim 16, wherein the electronic device further comprises a hinge, the display being rotatable relative to the chassis via the hinge, wherein moving the barrier from the first position to the second position comprises moving the barrier from the first position to the second position in response to the display rotating from a first rotational position relative to the chassis to a second rotational position relative to the chassis.

18. The method of claim 17, further comprising determining, by a sensor, when the display is in the second rotational position, wherein moving the barrier from the first position to the second position comprises moving, by an actuator, the barrier from the first position to the second position when the sensor determines the display is in the second rotational position.

19. The method of claim 17, wherein the barrier is physically attached to the hinge or the display, and wherein the rotation of the display from the first rotational position relative to the chassis to the second rotational position relative to the chassis causes the barrier to move from the first position to the second position.

20. The method of claim 16, further comprising moving the barrier away from the second vent towards the first vent, from the second position to the first position in response to movement between the display and the chassis, the barrier blocking the first vent in the first position.

21. A computing device, comprising:
a chassis comprising:
an intake vent;
a first exhaust vent on a first surface of the chassis; and
a second exhaust vent on a second surface of the chassis, distinct from the first surface;
a display configured to move between a first rotational position and a second rotational position; and
an airflow management device configured to:
while the display is in the first rotational position, direct air flow from the intake vent to the first exhaust vent by restricting air flow access to the second exhaust vent; and
while the display is in the second rotational position, direct air flow from the intake vent to the second exhaust vent by restricting air flow access to the first exhaust vent.

* * * * *